(12) United States Patent
Alam et al.

(10) Patent No.: US 7,392,026 B2
(45) Date of Patent: Jun. 24, 2008

(54) MULTI-BAND MIXER AND QUADRATURE SIGNAL GENERATOR FOR A MULTI-MODE RADIO RECEIVER

(75) Inventors: Mohammed S. Alam, Grayslake, IL (US); Daniel L. Kaczman, Gurnee, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 485 days.

(21) Appl. No.: 11/098,490

(22) Filed: Apr. 4, 2005

(65) Prior Publication Data
US 2006/0223487 A1  Oct. 5, 2006

(51) Int. Cl.
*H04B 1/06* (2006.01)
(52) U.S. Cl. ............... 455/180.1; 455/189.1; 455/313
(58) Field of Classification Search .................. None
See application file for complete search history.

(56) References Cited
U.S. PATENT DOCUMENTS

| | | | |
|---|---|---|---|
| 2,447,392 A * | 8/1948 | Byrne .................... 455/87 |
| 5,926,751 A | 7/1999 | Vlahos et al. |
| 5,966,666 A * | 10/1999 | Yamaguchi et al. ...... 455/552.1 |
| 6,029,052 A | 2/2000 | Isberg et al. |
| 7,242,912 B2 * | 7/2007 | Maligeorgos et al. ......... 455/88 |
| 2004/0097210 A1 | 5/2004 | Sato |
| 2004/0253938 A1 | 12/2004 | Vaara |

* cited by examiner

*Primary Examiner*—Thanh Cong Le
(74) *Attorney, Agent, or Firm*—Craig J. Yudell; Dillon & Yudell LLP

(57) ABSTRACT

A multi-band high gain mixer and quadrature signal generator allows a receiver system to receive signals at multiple frequency bands without requiring significant hardware duplication. A single mixer directly receives any of three communication frequency bands such as Universal Mobile Telecommunication System (UMTS), Personal Communication Services (PCS), Digital Communication System (DCS), and Japan and US W-CDMA 800 bands without amplification. A Serial-Parallel Interface selectably forwards RF signals within the receiver's frequency channels to the mixer for demodulation into in-phase (I) and quadrature (Q) signals at a common IF output from the multi-mode receiver. Significant power and cost advantages are attained by elimination of duplicate mixers and amplifier stages.

19 Claims, 4 Drawing Sheets

MULTI-BAND MIXER AND QUADRATURE SIGNAL GENERATOR FOR A MULTI-MODE RADIO RECEIVER

BACKGROUND OF THE INVENTION

1. Field of the Invention

The present invention relates generally to multiple-band (multi-band) wireless communication devices and systems. More particularly, the present invention relates to multi-band mixers and quadrature signal generators useful in multi-band wireless receivers of wireless communication devices.

2. Description of the Related Art

As the field of wireless communications continues to develop at a rapid pace, the resulting increased number of systems and frequency bands in use continues to complicate the delivery of wireless communications to consumers. In many cases, network operators providing services on one particular frequency band have had to add service on additional bands to accommodate its customers demand for wireless service. Further, the carriers have had to deploy multiple wireless communication systems using different technical standards. Accordingly, advanced communication devices, such as cellular radio telephones, must be able to communicate at multiple frequencies pursuant to multiple technical standards to enable communications on the varied wireless communication systems the device may encounter.

Dual- or multi-band telephones are particularly desirable where the different wireless communication systems operate at different carrier frequencies or frequency bands, but use the same modulation scheme and baseband processing scheme. The well-known Global System for Mobile communications (GSM), Personal Communication Services (PCS), and Digital Communication System (DCS) systems share such similarities, for example. Moreover, in today's digital mobile radio systems, more than one frequency band is available for RF (Radio Frequency) transmission. For instance, GSM in Europe uses two frequency bands of 25 MHz bandwidth centered at 900 MHz (GSM 900) and 1800 MHz (GSM 1800), respectively, where each of these frequency bands comprises an up-link (information transfer from mobile station to base station) and a down-link (information transfer from base station to mobile station) frequency band. In the United States, these two GSM frequency bands are centered at 850 and 1900 MHz respectively. GSM also provides for each of the up- and down-link bands to include a plurality of Frequency Division Multiplex (FDM) sub-band RF channels of 200 kHZ bandwidth each. Accordingly, a dual-band GSM mobile phone is capable of transmitting and receiving both the GSM 900 and GSM 1800 bands.

An exemplary prior art dual-band radio-receiver is shown in FIG. 1, where RF signals transmitted from a base station are received by the receiver at an antenna 10, which passes the RF signals to a band splitter 30, which splits the received signals into first and second (or more) bands. First and second band pass filters (BPF) 12a and 12b filter the split signals in the first and second bands, respectively, permitting the receiver to receive in each of the two separate communication bands. The filtered signals output by BPF 12a, 12b are supplied to quadrature demodulation (demod) units 32a-32b, respectively, which convert the band pass-filtered signals into in-phase (I signal) and quadrature (Q signal) baseband signals for further processing. The quadrature demodulation units 32a-b include low-noise amplifiers (LNA) 34a-b, dividers 20a-b and mixers 40a-b. The dividers 20a-b divide the intermediate frequency signal received from the local oscillators (LO) 36a-b to create intermediate divide=by-2, divide-by-4 signals having a phase difference of 90°. A first mixer (mixer pairs 40a, 41a) and a second mixer (pairs 40b, 41b) mix the generated LO signals with the amplified received signals to generate the I and Q baseband signals, which are low-pass filtered by in-phase low pass filter 42a and a quadrature low pass filter 42b, respectively. The filtered I and Q signals are then passed to baseband processing circuitry 44, which is conventional baseband processing circuitry as is well-known in the art.

As will be appreciated by reference to the receiver of FIG. 1, it is difficult to provide a multi-mode radio receiver for processing signals at multiple frequencies without duplicating many receiver hardware components. In the prior art, separate band pass filters, dividers, local oscillators, mixers and low pass filters for each serviced frequency band are designed into the receiver. Accordingly, it would be desirable to provide a receiver for a wireless communication device capable of receiving signals at multiple frequency bands, while minimizing the power consumption and duplication of receiver hardware.

BRIEF DESCRIPTION OF THE DRAWINGS

This invention is described in a preferred embodiment in the following description with reference to the drawings, in which like numbers represent the same or similar elements, as follows.

In the following detailed description of exemplary embodiments of the invention, reference is made to the accompanying drawings, which form a part hereof, and in which is shown by way of illustration specific exemplary embodiments in which the invention may be practiced.

DETAILED DESCRIPTION OF PREFERRED EMBODIMENTS

A multi-band high gain mixer and quadrature signal generator in accordance with the present invention allows for a receiver system to receive signals at multiple frequency bands without requiring significant hardware duplication. To achieve this result, a single mixer of a preferred embodiment can directly receive any of the DCS, PCS and Universal Mobile Telecommunication System (UMTS)) (including UMTS Japan 800 MHz and UMTS US 800 MHz bands) without amplification, and mix the RF inputs with a single local oscillator signal to generate a common IF output from the multi-mode receiver. Elimination of all low noise amplifiers (LNAs) and the duplicate mixers seen in the prior art presents a radio receiver having significantly reduced die area and current drain.

Figure 1:
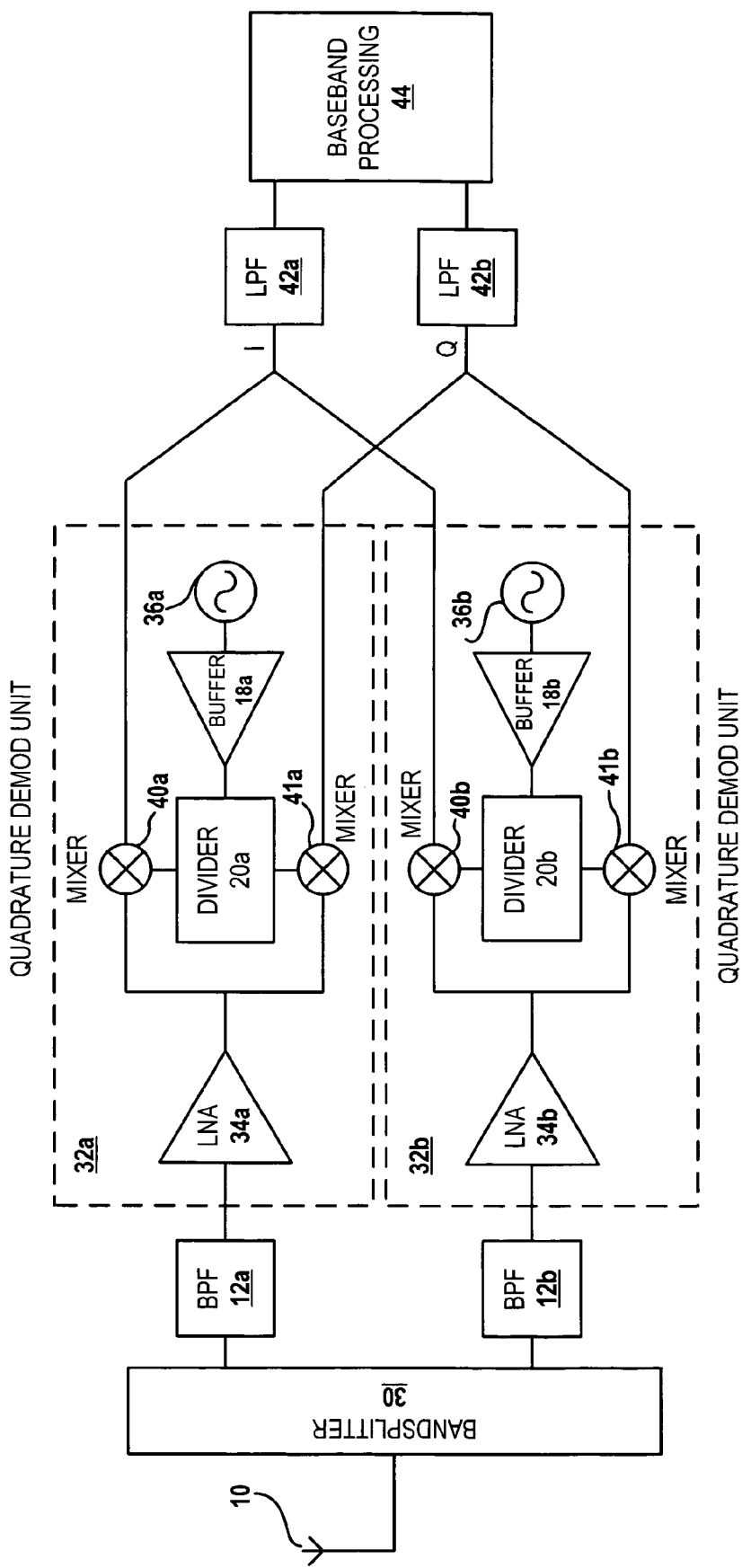
FIG. 1 is a prior art dual-band radio-receiver.
Figure 2:
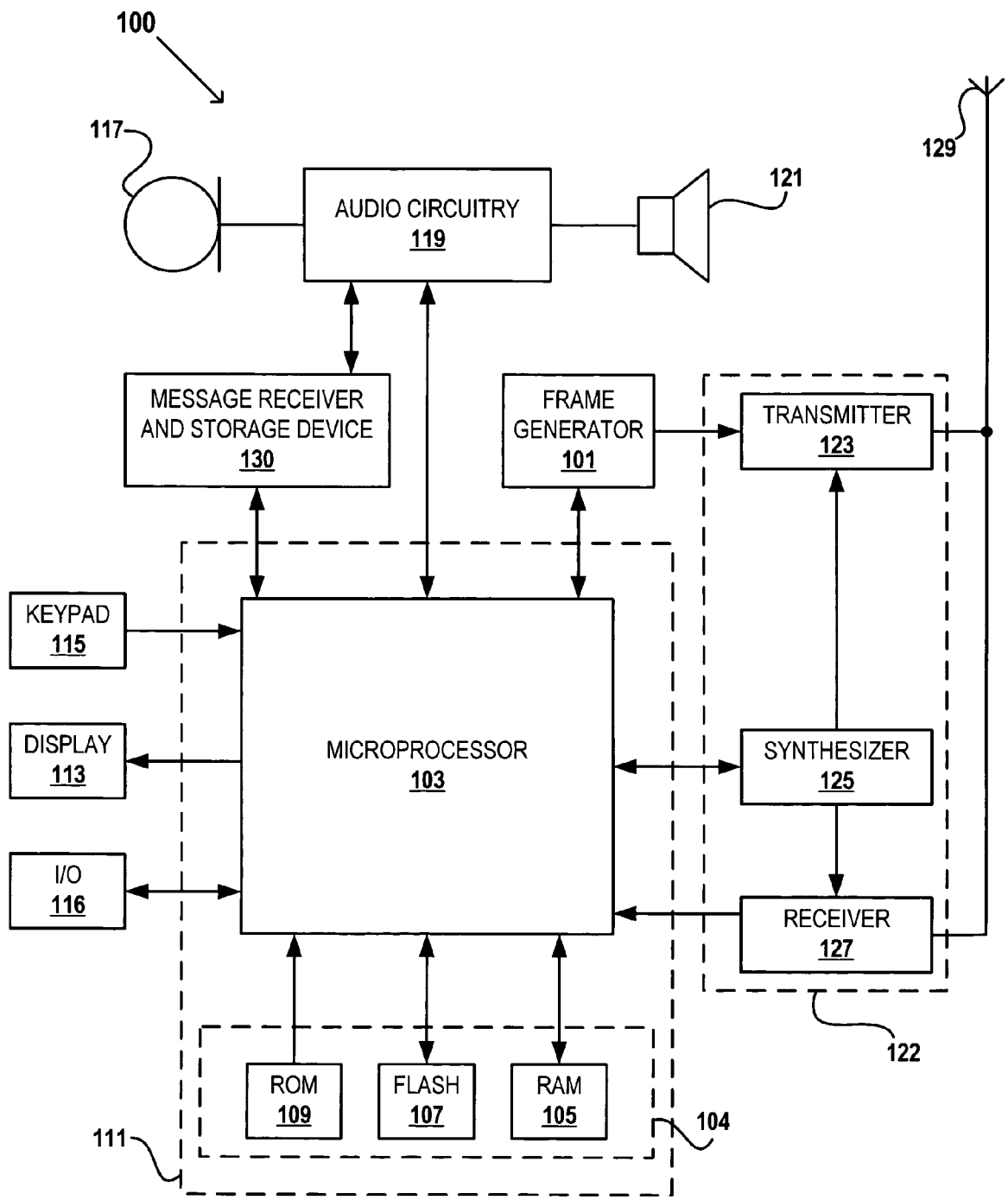
FIG. 2 a block diagram of a wireless communication device, such as a cellular radio telephone, incorporating the present invention.

With reference now to FIG. 2, depicted is a block diagram of a wireless communication device 100, such as a cellular radio telephone, incorporating the present invention. In a preferred embodiment, a frame generator ASIC 101 and a microprocessor 103, combine to generate the necessary communication protocols for operating in a cellular communication system. Microprocessor 103 uses memory 104 comprising RAM 105, FLASH 107, and ROM 109, preferably consolidated in one package 111, to execute the steps necessary to generate the protocol and to perform other functions for the wireless communication device 100, such as writing to a display 113, accepting information from a keypad 115, accepting input/output (I/O) information by way of a connector 116, controlling a frequency synthesizer 125, or performing steps necessary to amplify a signal according to the method of the present invention. Microprocessor 103 also processes audio transformed by audio circuitry 119 from a microphone 117 and to a speaker 121. The wireless communication device 100 may optionally include a message receiver and storage device 130 including digital signal processing means for use as, for example, a digital answering machine or a paging receiver.

A transceiver 122 processes radio frequency signals for the wireless communication device 100. In particular, a transmitter 123 transmits via an antenna 129 using carrier frequencies produced by a frequency synthesizer 125. Information signals received by the antenna 129 enters receiver 127 and are demodulated using carrier frequencies from frequency synthesizer 125. The resulting baseband signals are delivered to microprocessor 103 for baseband processing, as is well known in the art.

Figure 3:
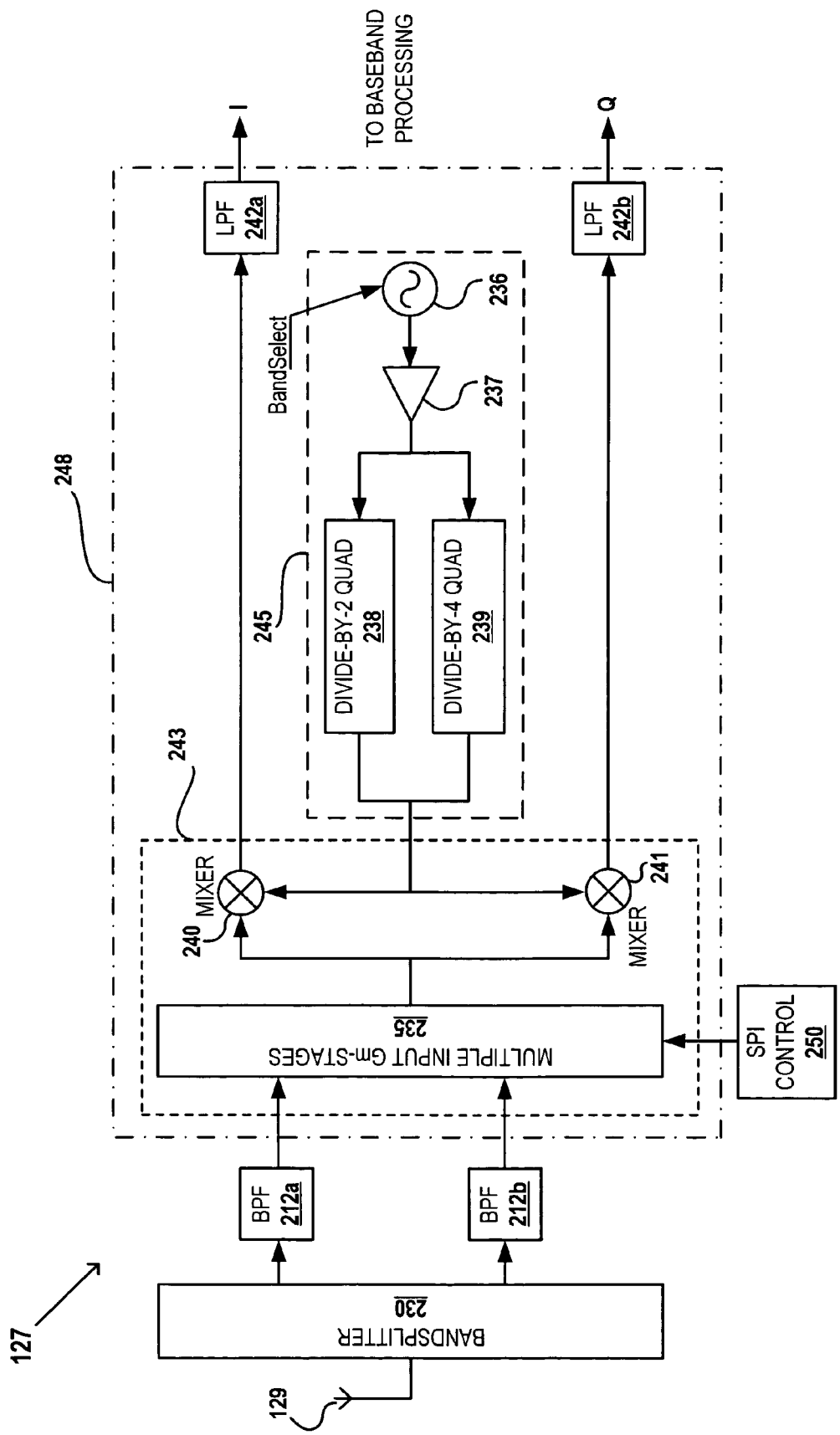
FIG. 3 shows a block diagram of a receiver operable for providing multi-band receiving functionality for wireless communication device, in accordance with a preferred embodiment of the present invention.

FIG. 3 shows a block diagram of a receiver 127 operable for providing multi-band receiving functionality for wireless communication device 100, in accordance with a preferred embodiment of the present invention. In this embodiment, a single multi-band high gain mixer (comprising two mixer core components 240, 241 for I and Q channels and an multiple-input transconductance (gm) stage 235) mixes received signals in the dual-band serviced by wireless communication device 100. Receiver 127 is coupled to an antenna 129 for receiving RF signals transmitted from a base station or other RF transmitter. A band splitter 230 coupled to antenna 129 splits the received signals into a first and second (or more) band or path for output to band pass filters (BPF) 212a and 212b coupled thereto. Bandsplitter 230 may be selectable by microprocessor 103 such that only selected frequency bands are passed to BPF 212. In other embodiments, software or filtering components can be used to select the desired frequency band. Signal for selecting the operating frequency band are output from microprocessor 103 or synthesizer 125, for example, to indicate the frequency band currently being received by wireless communications device 100. This band selection can be identified by the subscriber or by a control signal supplied with the received communication signal.

First and second band pass filters (BPF) 212a and 212b filter the split signals into first and second frequency bands, respectively, permitting the receiver 127 to select the desired communication band for receiving. For example, band pass filters 212 may be configured to filter bandwidths in each of the UMTS 2100 and DCS 1800 bands. Band pass filters 212 are frequency (band) specific and can be omitted if the receiver linearity is relatively high. Alternatively, band splitter 230 can be omitted if quality band pass filters are used. In most cases, band pass filters 212 are desirable to minimize power consumption. As another alternative, a single multi-band filter (not shown) having one input and multiple outputs (1 output per band) could replace the band splitter and band pass filters.

The filtered signals output by band pass filters 212a, 212b are supplied to a multi-input serial-parallel interface (SPI)-selectable gm-stage 235 for selection of the desired operating frequency band of the wireless communication system. Gm-stage 235 receives each of the filtered bandwidths from BPFs 212 as inputs, and, in response to the applied control signal from SPI control 250, selects a band path (one of the two outputs from BPFs 212) for output to mixer cores 240, 241. Band paths with asserted RF signals are selected to be output to mixing circuitry, while non-asserted signal band paths are turned off and draw no current in the receiver 127.

Quadrature demodulation unit 248 generates in-phase (I signal) and quadrature (Q signal) components of the received signals in the selected frequency band. Included within quadrature demodulation unit 248 is a single multi-band high gain mixer 243 (comprising two mixer core components 240, 241 and gm-stage 235) that mixes the received signals from switch 235 with quadrature signals output by quadrature signal generator 245. Quadrature signal generator 245 has a voltage controlled oscillator (VCO) 236 for generating a local oscillator signal (LO) on the input of a buffer 237 coupled thereto. VCO 236 has a relatively large bandwidth, sufficient to include all of the frequency bands which the receiver is capable of receiving, or alternatively can be switchable between multiple oscillations of frequency. An amplified oscillator signal is output from buffer 237 to each of the inputs of a high-band quadrature generator 238 and a low-band quadrature generator 239 coupled thereto to be separated into in-phase (I) and quadrature (Q) components (i.e., signals separated by 90° in phase). Quadrature generator 238 is a divide-by-2 quadrature generator for relatively high-bands, for example, PCS 1900, DCS 1800 and UMTS 2100. Quadrature generator 239 is a divide-by-4 that generates quadrature signals at a relatively low-band, for example, GSM 800, 900 MHz, and Japan and US W-CDMA 800 MHz. Accordingly, quadrature generators 238, 239 divide the intermediate frequency LO signal received from buffer 237 into halves (Divide-By-2 Quadrature Generation) or into quarters (Divide-By-4 Quadrature Generation), depending upon the received band, thereby resulting in LO signals of half or a quarter frequency, respectively, having a phase difference of 90° (I and Q) at the output of quadrature signal generator 245. Because quadrature generators 238, 239 use the same input buffer and share the same bias circuit, die area of the integrated circuit is reduced.

In the alternative, quadrature signal generators 238, 239 can also be replaced by a frequency divider, which generates quadrature local oscillator (LO) signals from the oscillation signal generated by VCO 236. By dividing a signal's frequency by 2, it is possible to generate 2 quadrature signals. A differential signal at a frequency 2f is divided by 2 and the rising edge of each signal controls the edge of the divided signal. Since a ½ wavelength at 2f is equal to a ¼ of a wavelength at frequency f, the resulting signals are quadrature signals. If a frequency divider is used, VCO 236 must operate at an appropriate multiple of the desired frequency; for example, when operating at 1 or 2 frequencies, the frequency divider divides by 2 or 2 and 4, respectively.

A single mixer 243 (comprised of the mixer cores 240 and 241 and gm-stage 235) receives the local oscillator I and Q signals from quadrature signal generator 245 at LO inputs of the mixer cores 240 and 241, and the RF signals at the inputs of the gm-stage 235, which converts the voltage to current at the output. Mixer cores 240 and 241 mix the received RF inputs with the corresponding I signals and Q signals, respectively, to generate IF outputs with in-phase and quadrature components. As will be appreciated, two mixer cores 240, 241 are required to demodulate a single RF signal using quadrature demodulation and are therefore considered components of a single mixer 243. In alternative preferred embodiments utilizing other demodulation techniques-for example, using just the in-phase component signal—only a single mixer core (i.e., either mixer core 240 or mixer core 241) is needed to demodulate a given RF signal. The I and Q signal outputs from mixer 243 are coupled to an in-phase low pass filter 242a and a quadrature low pass filter 242b, respectively. Low pass filters 242a and 242b preferably have programmable bandwidth to enable receiver 127 to accommodate two or more bands having different bandwidths. The filtered I and Q signals are then passed to baseband processing circuitry for baseband processing as is well-known in the art.

Figure 4:
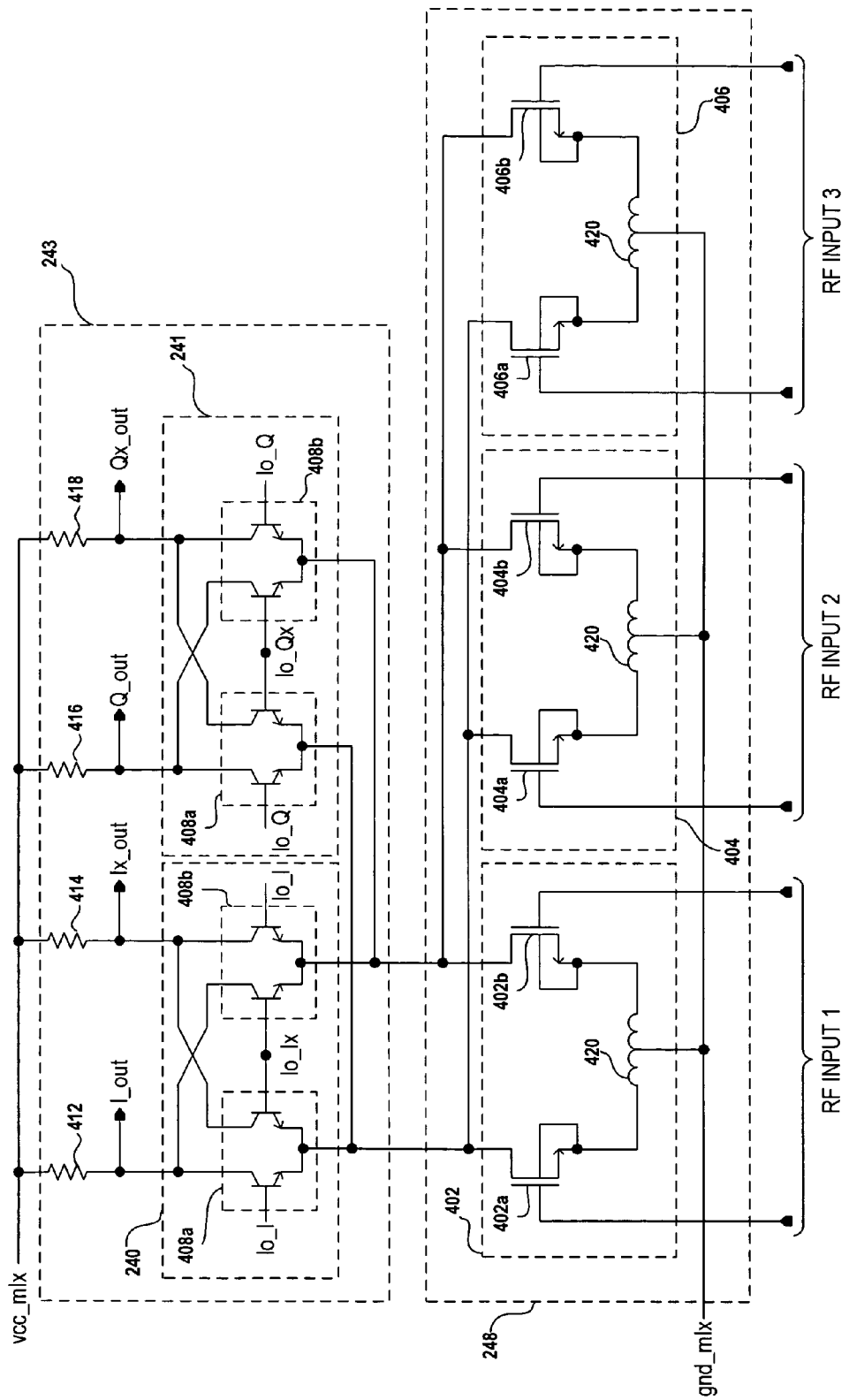
FIG. 4 shows a circuit diagram of switch and mixer, in accordance with a preferred embodiment of the present invention.

With reference now to FIG. 4, a circuit diagram of gm-stage 235 and mixer 243 is shown, in accordance with a preferred embodiment of the present invention. As implemented in one embodiment, receiver 127 is a tri-band receiver, capable of supporting three separate frequency bands, for example UMTS, PCS, and Japan and US WCDMA 800. Each of the RF input signals from the three input bands are shown as differential inputs RF Input 1, RF Input 2 and RF Input 3 in the embodiment of FIG. 4. RF Inputs 1,2,3 are coupled as inputs to SPI selectable gm-stage 235 at 402, 404, 406, respectively. Each gm-stage 402, 404, 406 contains a n-type Metal Oxide Semiconductor (MOS) transistor pair 402a-b, 404a-b, 406a-b, respectively. RF signals for different bands are inputted to the gates of the transistor pairs 402a-b, 404a-b, 406a-b and the outputs of transistor pairs 402a-b, 404a-b, 406 a together and pass through the I and Q channel mixer cores 240 and 241. Thus the same current is shared by the gm-stage and the mixer cores. The source of the transistors pairs 402a-b, 404a-b, 406a-b are coupled to the differential inductors 420a, 420b, and 420c respectively. The center of the differential inductors are connected to ground. For improved performance, the body and source are coupled together for the MOS devices in the gm-stage 235, the multi-band high gain mixer 243 and quadrature signal generator 245 to improve input-referred $3^{rd}$-order intercept points (IIP3) without increasing the current drain of the devices. When gm-stage 402 receives RF input 1, the other gm-stages 404 and 406 are turned off by SPI control 250. Alternatively, receiver 127 can be implemented as a dual-band receiver by eliminating gm-stage 406 without affecting the operation of receiver 127. The outputs of gm-stages 402-406 are coupled in parallel to differential inputs of mixer 243. The g-m stages 235 operate together as a multiplexer input of the RF inputs to the mixer 243, at the control of SPI control 250. Because the outputs of the gm stages are coupled together in parallel going into just a single mixer and load, the die area of the mixer cells and load is reduced.

Each mixer core 240, 241 of mixer 243 is interconnected using four n-type Bipolar transistors (identified as transistors pairs 408a-b and transistors pairs 410a-b, respectively) to form the well-known "Gilbert Cell" mixer configuration. A Gilbert Cell is a mixer configuration used for radio telephones and other RF applications, the design and operation thereof being well-known to those skilled in the art, and therefore will not be described in detail. Mixer core 240 generates a differential in-phase (I) signal output (I_out, Ix_out), resulting from mixing the selected RF input from gm-stage 235 and the differential in-phase LO signals (lo_I, lo_Ix) received from quadrature generator 245, at the nodes between mixer 240 and load resistors 412, 414. Mixer core 241 generates a differential quadrature (Q) signal output (Q_out, Qx_out), resulting from mixing the selected RF input from gm-stage 235 and the differential quadrature LO signals (lo_Q, lo_Qx) received from quadrature generator 245, at the nodes between mixer 241 and load resistors 416, 418. The circuit shown in FIG. 4 has ground connection (gnd_mix) at the center of the inductors 420a-c and chip supply (vcc_mix) at a terminal end of load resistors 412-418. As will be understood by those skilled in the art, when a received frequency band is selected, the bias currents for the mixer core, band selection stages and quadrature signal generators are SPI-selectable to optimize transceiver linearity, gain and noise figures.

While preferred embodiments of the present invention have been described as dual-band (FIG. 3) and tri-band (FIG. 4) receivers, it will be appreciated that the present invention is not limited to those embodiments and may be implemented as a quad-band or multi-band (greater than 4 bands) receiver by modification of the described preferred embodiments to include additional RF paths at the input of gm-stage 235 for receiving signals of other communication systems. These preferred embodiments are implemented by transmitting each additional RF input to the differential RF inputs of an additional gm-stage connected at its output in parallel with gm-stage 402-406 at mixer 243's inputs. For example, wireless communication device 100 could be adapted to receive GSM 900 MHZ signals in a fourth RF path to gm-stage 235. Thus, as will be appreciated, although three differential RF inputs are shown in the present embodiment, additional stages could be employed as necessary depending upon the number of receiving frequency bands desired.

As has been shown, the present invention provides significant power and cost advantages by uniquely configuring SPI selectable stages for band selection with one high gain multi-band mixer to provide a multi-band receiver. The elimination of individual mixers for each band and the need for LNA input stages substantially reduces die area and current drain of the integrated circuit. Further, only a single input buffer and bias circuit are needed for each of the quadrature signal generators further reducing die area and current drain.

In one aspect of the invention, a receiver includes multiplexer circuitry having a plurality of inputs, wherein each input of the plurality of inputs is coupled to a separate signal path of a plurality of signal paths and each signal path receiving a RF signal from among a plurality of RF signals in separate frequency bands. The multiplexer circuitry selectively transmits a RF signal received on an input of the plurality of inputs to an output of the multiplexer circuitry. The receiver also includes a mixer coupled to the multiplexer circuitry for receiving the selectively transmitted RF signal and reference signals and combining the selectively transmitted RF signal and reference signals to generate output signals.

In another aspect of the invention, a communication device for receiving communication signals in a plurality of frequency bands includes antenna circuitry to receive communication signals in a plurality of frequency bands, a first signal path coupled to the antenna circuitry to receive communication signals in a first frequency band of said plurality of frequency bands, a second signal path coupled to the antenna circuitry to receive communication signals in a second frequency band of said plurality of frequency bands, and a signal path selection circuit coupled to the first and second signal paths, wherein communication signals detected on either of the first or second signal paths are transferred to an output of the signal path selection circuit. The communication device also includes a signal generator for generating reference signals, and a mixer coupled to the output of the signal path selection circuit to receive transferred communication signals thereon and combine with the reference signals to generate output communication signals.

In yet another aspect of the invention, a method for receiving communication signals in plurality of frequency bands includes the steps of receiving communication signals in any one of a plurality of frequency bands, the communication signal having a bandwidth, coupling the communication signals in a first frequency band of the plurality of frequency bands to a first signal path, coupling communication signals in a second frequency band of the plurality of frequency bands to a second signal path, coupling asserted communication signals in one of the first signal path or the second signal path to a first input of a mixer, and coupling local oscillator signals to a second input of the mixer. The method concludes with the step of mixing the local oscillator signals with said asserted communication signals in either the first frequency band or the second frequency band to generate an output of the mixer.

Although the invention has been described and illustrated in the above description of drawings, it is understood that this description is given by way of example only and that numerous changes and modifications can be made by those skilled in the art without departing from the true spirit and scope of the invention. For example, specific radio telephone systems having specific receive bands are described. However, other systems using other technical standards or frequency bands are contemplated by the present invention. Moreover, although the present invention finds particular application in portable cellular radio telephones, the present invention could be applied to any wireless communication device, including, for example, pagers, electronic organizers, computers, or games. While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. A receiver, comprising:
   selection circuitry having a plurality of inputs, wherein each input of the plurality of inputs is coupled to a separate signal path of a plurality of signal paths, each signal path receiving a RF signal from among a plurality of RF signals in separate frequency bands, wherein the selection circuitry selectively transmits a RF signal received on an input of the plurality of inputs to an output of the selection circuitry, wherein the selection circuitry comprises a first plurality of transistors, each receiving a separate RF signal from among the plurality of RF signals on a control node and outputting a received RF signal on a current electrode, the current electrodes of all transistors being connected in parallel; and
   a mixer core coupled to the selection circuitry receiving the selectively transmitted RF signal and reference signals, the mixer combining the selectively transmitted RF signal and reference signals to generate output signals.

2. The receiver of claim 1, further comprising a quadrature signal generator for generating at least an in-phase reference signal and at least a quadrature reference signal comprising the reference signals.

3. The receiver of claim 2, wherein the quadrature signal generator comprises a high-band quadrature generator and a low-band quadrature generator connected in parallel to an input of the mixer.

4. The receiver of claim 2, further comprising a voltage controlled oscillator outputting a local oscillator signal to an input of the quadrature signal generator.

5. The receiver of claim 2, wherein the quadrature signal generator generates reference signals in two or more frequency bands, a frequency band of the reference signals being determined as a function of the frequency band of the selectively transmitted RF signal.

6. The receiver of claim 2, wherein the quadrature signal generator includes at least one frequency dividing means for dividing a received local oscillator signal.

7. The receiver of claim 1, wherein the selectively transmitted RF signal is at a selected frequency band from among a plurality of frequency bands received by the receiver.

8. The receiver of claim 1, wherein the mixer core comprises two mixer cores, each mixer core mixing one of an in-phase reference signal and a quadrature reference signal comprising the reference signals.

9. The receiver of claim 1, wherein the mixer core comprises a second plurality of transistors interconnected to provide one or more Gilbert Cell mixer configuration, the Gilbert Cell mixer configuration coupled to the parallel connected electrodes.

10. A communication device for receiving communication signals in a plurality of frequency bands, the communication device comprising:
    antenna circuitry to receive communication signals in a plurality of frequency bands;
    a first signal path coupled to the antenna circuitry to receive communication signals in a first frequency band of said plurality of frequency bands;
    a second signal path coupled to the antenna circuitry to receive communication signals in a second frequency band of said plurality of frequency bands;
    a signal path selection circuit coupled to the first and second signal paths, wherein communication signals detected on either of the first or second signal paths are transferred to an output of the signal path selection circuit, wherein the signal path selection circuit comprises a first plurality of transistors, each receiving a separate RF signal from among the plurality of RF signals on a control node and outputting a received RF signal on a current electrode, the current electrodes of all transistors being connected in parallel;
    a signal generator for generating reference signals; and
    a mixer core coupled to the output of the signal path selection circuit to receive transferred communication signals thereon and combine with the reference signals to generate output communication signals.

11. The communication device of claim 10, wherein received communication signals are amplified by the signal path selection circuit.

12. The communication device of claim 10, wherein the output communication signals are in-phase and quadrature output signals.

13. The communication device of claim 10, wherein the signal generator is a quadrature signal generator for generating quadrature local oscillation signals.

14. The communication device of claim 10, further comprising a first filter coupled in series between the antenna and signal path selection circuit, wherein the first filter passes communication signals that are within the first frequency band.

15. A method for receiving communication signals in plurality of frequency bands, said method comprising the steps of:
    receiving communication signals in any one of a plurality of frequency bands, the communication signal having a bandwidth;
    coupling the communication signals in a first frequency band of the plurality of frequency bands to a first signal path;
    coupling communication signals in a second frequency band of the plurality of frequency bands to a second signal path;

coupling asserted communication signals in each of the first and second signal paths to a first plurality of transistors, each receiving a separate communication signal from the communication signals on a control node and outputting a received communication signal on a current electrode, the current electrodes of all transistors being connected in parallel and coupled to a first input of a mixer;

coupling local oscillator signals to a second input of the mixer; and mixing the local oscillator signals with said asserted communication signals in either the first frequency band or the second frequency band to generate an output of the mixer.

16. The method of claim 15, wherein the local oscillator signal comprises in-phase signal and quadrature signals.

17. The method of claim 15, wherein the asserted communication signals are coupled to the mixer without amplification.

18. The method of claim 15, wherein the local oscillator signals are generated by low pass in-phase and quadrature filters having programmable bandwidths that are changed to accommodate communication signals of different bandwidths.

19. The method of claim 15 further comprising the steps of:

generating a first oscillator signal; and frequency-dividing the first oscillator signal to generate in-phase and quadrature oscillator signals, and wherein the local oscillator signals comprise the in-phase and quadrature oscillator signals.

* * * * *